United States Patent [19]

Coutant et al.

[11] Patent Number: 4,768,323
[45] Date of Patent: Sep. 6, 1988

[54] COMPOSITE TUBULAR ELEMENT INTENDED TO FORM A STRUCTURAL PART, PROCESS FOR MANUFACTURING IT AND DEVICE FOR CARRYING OUT THE PROCESS

[75] Inventors: Hervé Coutant, Le Chesnay; Jean-Pierre Jumel, Le Vesinet, both of France

[73] Assignee: Aerospatiale Societe Nationale Industrielle, Paris, France

[21] Appl. No.: 37,257

[22] PCT Filed: Aug. 18, 1986

[86] PCT No.: PCT/FR86/00287
    § 371 Date: Mar. 13, 1987
    § 102(e) Date: Mar. 13, 1987

[87] PCT Pub. No.: WO87/01069
    PCT Pub. Date: Feb. 26, 1987

[30] Foreign Application Priority Data
Aug. 21, 1985 [FR] France ................. 85 12592

[51] Int. Cl.⁴ .................................. E04C 3/28
[52] U.S. Cl. ........................... 52/309.1; 52/731; 156/218
[58] Field of Search ............. 52/730, 720, 731, 309.1, 52/727; 138/DIG. 2; 219/10.53; 428/33; 264/509; 156/218

[56] References Cited

U.S. PATENT DOCUMENTS

| Re. 23,317 | 1/1951  | Greenwald ........... 138/DIG. 2 |
| 726,801    | 4/1903  | Maxwell .................... 52/720 |
| 2,674,297  | 4/1954  | Greenwald ........... 138/DIG. 2 |
| 2,904,611  | 9/1959  | Duddy .................. 138/DIG. 2 |
| 3,941,294  | 11/1976 | Evans ..................... 219/10.53 |
| 3,948,704  | 4/1976  | Evans ........................... 156/69 |
| 3,991,294  | 11/1976 | Evans ..................... 219/10.49 |
| 4,020,202  | 4/1977  | Kreft ............................ 428/33 |
| 4,036,676  | 7/1977  | Pennington ........... 219/10.53 |
| 4,394,115  | 7/1983  | Dronet ....................... 264/509 |

FOREIGN PATENT DOCUMENTS 2065111 1/1973 Fed. Rep. of Germany .
1417300 10/1965 France .
  24338 of 1895 United Kingdom .

Primary Examiner—John E. Murtagh
Attorney, Agent, or Firm—Fisher, Christen & Sabol

[57] ABSTRACT

Structural tubular element (1) made of resistant fibers coated with hardenable resin and intended to form a part of a structure.

According to the invention, this tubular element is characterized in that it comprises an inner axial wall (4), also made of resistant fibers coated with hardenable resin, forming integral part with said element and extending over the whole length thereof and in that, at the ends (3) of said element (1), portions (4A) of said axial wall (4) are accessible to form zones of fixation of said element to other parts of said structure.

Production of structural parts, particularly in the aeronautical and spatial domains.

7 Claims, 3 Drawing Sheets

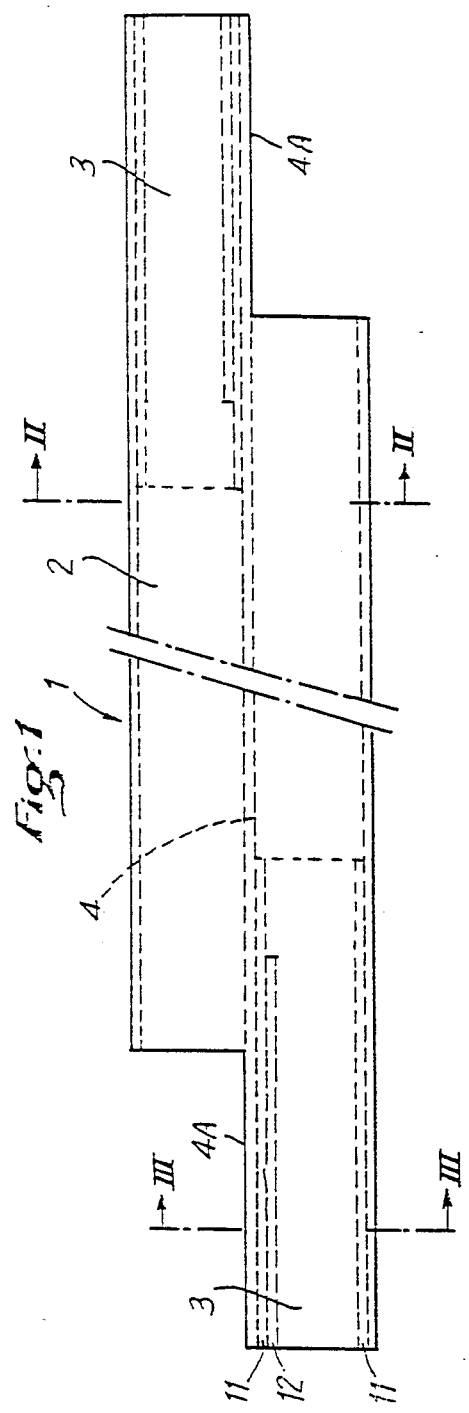
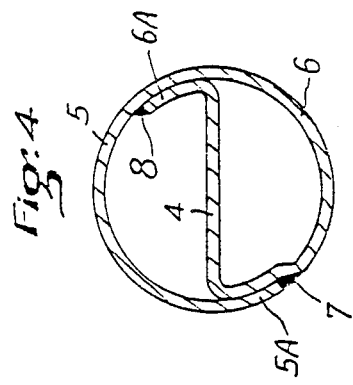
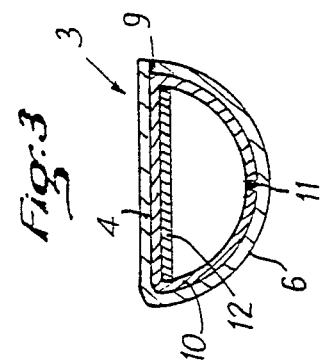
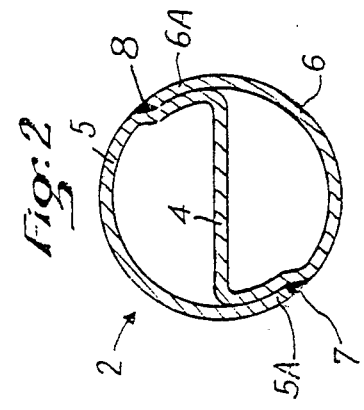

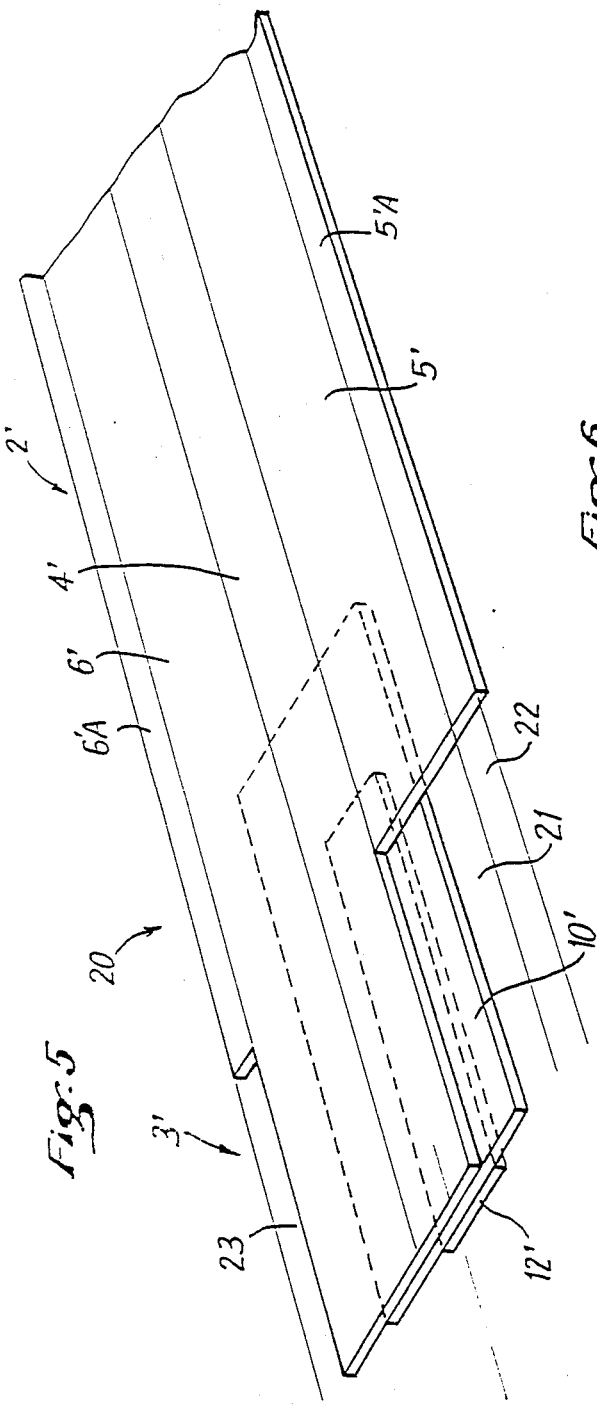
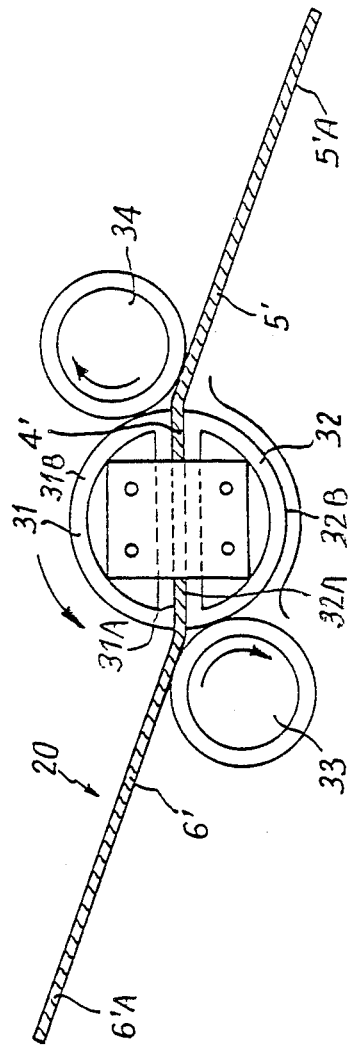

COMPOSITE TUBULAR ELEMENT INTENDED TO FORM A STRUCTURAL PART, PROCESS FOR MANUFACTURING IT AND DEVICE FOR CARRYING OUT THE PROCESS

The present invention relates to a composite tubular element, i.e. made of resistant fibers (glass, carbon, boron, etc . . . ) coated with hardenable resin, intended to form a light and resistant structural part. It is particularly, although not exclusively, adapted to produce structural parts for airplanes, helicopters, artificial satellites, etc . . . The present invention also relates to a process and to a device for manufacturing such a tubular element.

It has already been thought to make aeronautical or spatial structural parts, such as floor struts or chords of truss ribs for example, by means of composite tubular elements. Such elements work in traction, compression and bending and it is desirable that they present a good rigidity to buckling, as well as a good capacity to resist cutting efforts.

Furthermore, for their fixation to the other parts of a structure, the known tubular elements necessitate the arrangement of joining pieces at their ends.

These joining pieces are generally added and fixed by rivets and/or glued, with the result that the efforts are transferred by very localized zones, this leading to the necessity of considerable local reinforcements. Moreover, the joining pieces are most often made of metal, and this may result in problems of differential expansion and/or of galvanic corrosion.

For these additional reasons, the known composite tubular elements are not adapted to support efforts other than those of compression and of traction.

It is an object of the present invention to overcome these drawbacks and to produce composite structural tubular elements which are particularly resistant even to bending stresses and to cutting efforts, which may be connected to other parts of a structure without the arrangement of special added joining pieces.

To this end, according to the invention, a structural tubular element made of resistant fibers coated with hardenable resin and intended to form a part of a structure, is noteworthy in that it comprises an inner axial wall, also made of resistant fibers coated with hardenable resin, forming integral part with said element and extending over the whole length thereof and in that, at the ends of said element, portions of said axial wall are accessible to form zones of fixation of said element to other parts of said structure.

It is seen that said axial wall thus communicates to the tubular element excellent properties of resistance both in traction and in compression and in bending or to the cutting efforts, whilst allowing the connection to other structural parts (also constituted by identical tubular elements or totally different elements, such as for example metal sections), without arrangement of added joining pieces.

In fact, the accessible parts of said axial wall are preferably pierced with holes for the passage of fixation means, such as for example rivets, screws, bolts, etc . . . The accessible parts of said axial wall may be cleared on their two opposite faces. However, for purposes of mechanical strength, it is preferable if these parts are cleared only on one side, their other side being covered by the outer contour of said element.

The section of the current part (i.e. not including the ends) of said element therefore presents the at least approximate form of the Greek letter theta. This section may have a circular contour and the axial wall then becomes diametral. On the other hand, the section of the ends of said element is in the form of a likewise circular half-moon, possibly. The part of the outer curvilinear contour of the ends may be recessed opposite the holes for passage of the fixation means provided in the accessible parts of the axial wall, in order to facilitate the positioning of said fixation means. According to the arrangements of the structure to which said element belongs, the accessible end faces of said axial part may be directed in the same direction or in opposite directions.

Reinforcements of resistant fibers are preferably provided in the ends of said tubular element.

According to a preferred process of production, in order to obtain a tubular element according to the present invention, a flexible band composed of resistant fibers coated with hardenable resin is wound around its longitudinal axis, in order to obtain a supple, elongated, tubular element having a section at least approximately in the form of a theta, then said tubular element is subjected to the conditions of temperature and of pressure allowing hardening of said resin.

Accessibility of the end parts of the axial wall (diametral) may be obtained, either by machining after hardening of the resin, or by cutting out notches in said flexible band before winding.

The reinforcements of the ends are preferably constituted by portions of the same band of resistant fibers coated with hardenable resin. These portions are applied on the flexible band before it is wound. In the event of said flexible band being composed of a lap of unidirectional fibers, the fibers of said flexible band and those of the reinforcement parts may be arranged to have different directions, in order to optimalize said tubular element as a function of the direction and distribution of the efforts applied thereto.

In order to carry out this process, a device of the mandrel and mould type may be used, comprising two mandrels which are capable of being applied against each other by opposite faces corresponding to said inner axial wall and of which the surface, outside said faces, corresponds to the outer contour of said element.

In this device, the two mandrels may be rigid (for example made of steel), whilst the mould is retractable to cause the flexible band which is wound thereon to press against said mandrels, during the process of hardening of the resin. However, in an advantageous embodiment, said mould is rigid, whilst said mandrels are radially expansible and retractable.

The Figures of the accompanying drawing will clearly show how the invention may be carried out. In these Figures, identical references designate like elements.

FIG. 1 is a side view of an embodiment of a structural tubular element according to the invention.

FIGS. 2 and 3 are transverse sections, along lines II—II and III—III respectively, of FIG. 1.

FIG. 4 shows a variant of FIG. 2.

FIG. 5 illustrates a partial view in perspective of a blank from which the element of FIG. 1 may be made by winding.

FIG. 6 illustrates the process of winding of the blank of FIG. 5.

Figure 7:
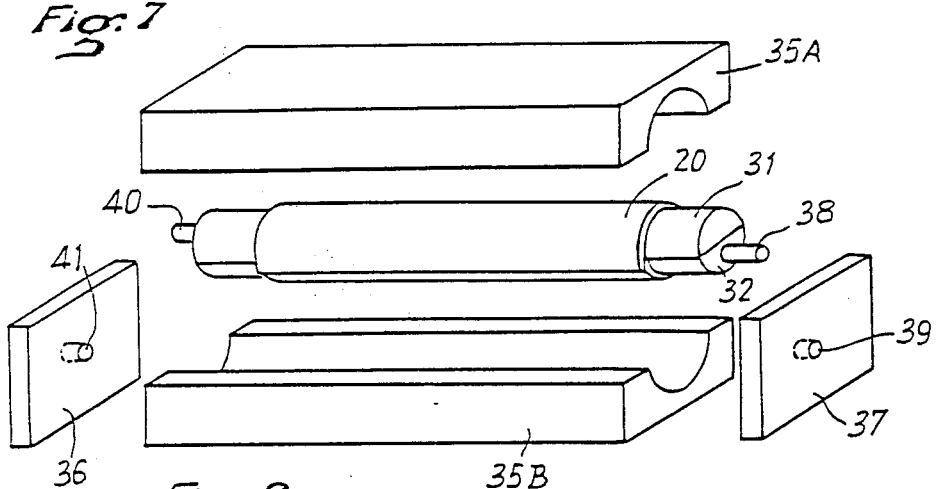
FIG. 7 shows, in an exploded schematic view, a device for making a tubular element according to the invention.

The structural tubular element 1, shown by way of example in FIG. 1, is made of resistant fibers coated with hardenable resin and is intended to form a part of a structure. It comprises an intermediate (or current) part 2 and two end parts 3.

In its intermediate part 2, the element 1 presents a circular theta shaped section, constituted by an inner diametral wall 4 and an outer circular contour formed by two semi-circles 5 and 6. The semi-circles 5 and 6 are respectively connected, on one side, to the diametrically opposite ends of the wall 4 and, on the other side, to respective extensions 5A and 6A, covering the other semi-circle 6 and 5. At the locations where extensions 5A and 6A cover respectively the semi-circles 6 and 5, the latter are inwardly deformed so that the outer line of contour of element 1 is perfectly circular, despite the excess thicknesses which result therefrom. Fillings of hardenable resin 7 and 8 ensure the continuity of the outer contour between the extensions 5A and 6A, on the one hand, and the semi-circles 6 and 5 on the other hand.

At its ends 3, the element 1 presents a section in the form of a circular half-moon, constituted by a part of the diametral wall 4 and by one or the other of the semi-circles 5 or 6. At the left-hand end, the semi-circle 5 has been eliminated and the face 4A of the wall 4 opposite the semi-circle 6 is accessible. At the right-hand end, the semi-circle 6 has been eliminated and face 4A of the wall 4, opposite the semi-circle 5 is accessible. In the embodiment of FIG. 1, the two accessible end portions 4A of the wall 4 are therefore directed in opposite directions (one upwardly and the other downwardly in FIG. 1).

At ends 3, the semi-circle 5 (or semi-circle 6) extend on one side the wall 4 and are connected to the latter, on the other side, by an adhesion 9 (hardenable resin).

Ends 3 may be provided with reinforcements, for example a semi-cylindrical reinforcement 10, of which the ends are glued to each other at 11, and a plane reinforcement 12.

FIG. 4 shows a variant section of part 2 of the element 1. In that case, the extension 6A is inside the semi-circle 5, instead of being outside.

In order to make the element 1 of FIG. 1, one may start from the blank 20 in band form shown in FIG. 5. This blank comprises an intermediate part 2' intended to form the intermediate part 2 and two end parts 3' (of which only one is shown in FIG. 5) corresponding to ends 3.

The intermediate part 2' is constituted by transversely juxtaposed elongated zones, namely a central zone 4' (intended to form the diametral wall 4) connected on one side to a zone 5' (intended to form the outer semi-circular wall 5) and on the other side to a zone 6' (intended to form the outer semi-circular wall 6). Laterally to band 20 are provided marginal zones 5'A (connected to zone 5') and 6'A (connected to zone 6') respectively intended to form the overlappings 5A and 6A.

At one of ends 3', the zones 5', 5'A and 6'A are respectively notched at 21, 22 and 23. At the other end 3' (not shown), it is zones 5'A, 6' and 6'A which are notched in symmetrical manner.

Furthermore, on one face if the band 20, at end 3', there are applied band portions 10' and 12' of resistant fibers, respectively intended to form reinforcements 10 and 12.

The principal direction of the resistant fibers of parts 10' and 12' is preferably chosen to be different from that of band 20 in order to optimalize the effect of the reinforcements 10 and 12.

After complete preparation of the blank 20, the latter is pressed (cf. FIG. 6) between two elongated mandrels, with axes parallel to the length of the band 20 and having a semi-circular section 31 and 32; the diametral faces 31A and 32A of said mandrels come into superposition of zone 4', on either side of said blank. Then, zones 5' and 5'A are would over the cylindrical wall 32B of the mandrel 32, whilst zones 6' and 6'A are wound over cylindrical wall 31B of mandrel 31.

The assembly of mandrels 31 and 32 and band 20 wound thereover in the manner described is introduced in a mould 35A, 35B and 37 (FIG. 7). This mould is for example constituted by two rigid shells 35A and 35B and by end plates 36 and 37, likewise rigid. On the other hand, mandrels 31 and 32 are inflatable thanks to connections 38, 40 respectively traversing the plates 37 and 36 via holes 39 and 41.

After positioning of assembly 31, 32, 20 in said mould, the latter is closed, mandrels 31 and 32 are inflated and the conditions of hardening of the resin of blank 20 and of parts 10' and 12' are realized.

After hardening of said resin and opening of the mould, element 1 is then obtained.

Of course, after it has left the mould, the element according to the invention may be subjected to finishing operations (cutting to length, trimming, piercing of through holes in ends 4A) and monitoring operations (for example by ultrasounds). Element 1 may be made with an identical theta section over the whole of its length, end portions 4A of the diametral wall 4 then being cleared, on one or two faces, by machining at the moment of finishing.

Figure 8:
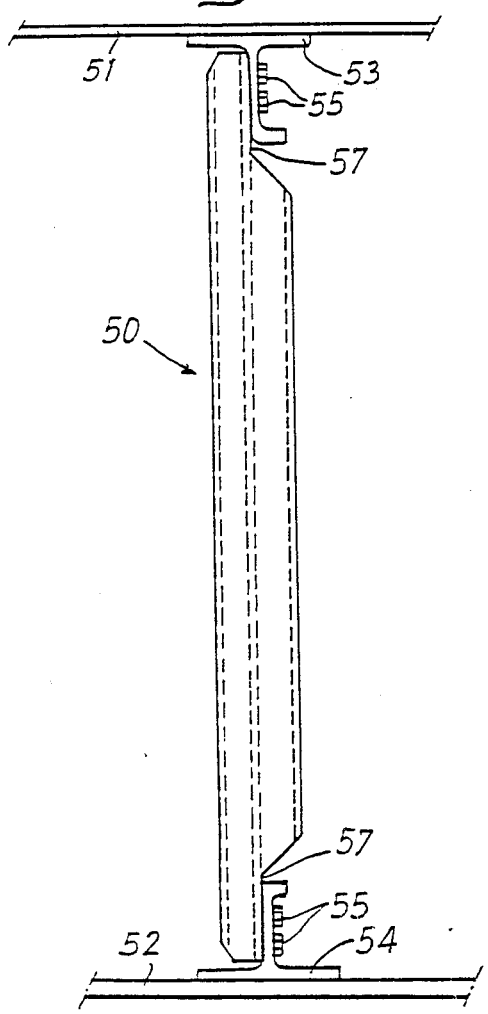
FIG. 8 shows a portion of truss structure comprising a tubular element according to the invention, but different from that of FIG. 1.
Figure 9:
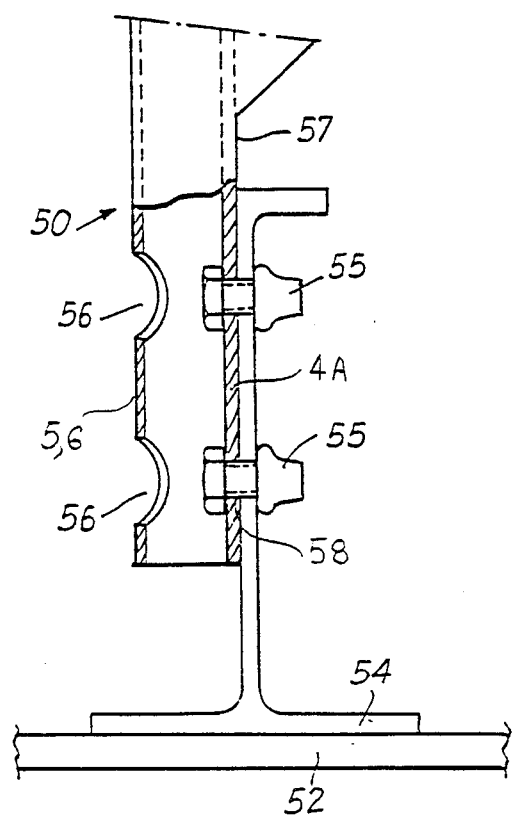
FIG. 9 illustrates the fixation of the tubular element of FIG. 8 to another element of said truss structure.

FIG. 8 shows a variant embodiment 50 of the element according to the invention, assembled with other elements (for example sections) 51 and 52 of a truss structure, via fixing tabs 53 and 54 and through fixation means 55 (screws and nuts). In this embodiment, the two faces 57 of the accessible parts 4A of the inner diametral wall are directed on the same side and are pierced with holes 58 for said fixation means 55. The circular wall 5 or 6 opposite these accessible parts 4A is pierced with holes 56 clearing accessibility to said fixation means 55.

We claim:

1. Process for making a structure tubular element intended to form part of a structure, made of a fiber-resin composite and comprising a tubular wall and an integral inner axial wall extending over the whole length of said element, portions of said tubular wall missing at the ends of said element in order to make portions of said inner axial wall accessible from the outside, said accessible portions of said tubular wall forming zones of fixation of said element to other parts of said structure, comprising winding around the longitudinally axis of said tubular wall, a flexible band 20 composed of resistant fibers coated with hardenable resin in order to obtain a flexible elongated tubular element having a section at least approximately in the form of a theta, and then subjecting said flexible tubular element to the conditions of temperature and of pressure thereby allowing the hardening of said resin.

2. Process according to claim 1 wherein notches are cut out in said flexible band before it is wound, in order to obtain accessibility of the ends of the axial wall without subsequent machining.

3. Process according to claim 1 or 2 wherein there are applied on said flexible band, before it is wound, portions of the same band constituted by resistant fibers coated with hardenable resin in order to obtain local reinforcements, the direction of the resistant fibers of said portions most often being different from that of the resistant fibers of said flexible band.

4. Structural tubular element intended to form part of a structure, made of a fiber-resin composite and comprising a tubular wall and an integral inner axial wall extending over the whole length of said element, portions of said tubular wall missing at the ends of said element in order to make portions of said inner axial wall accessible from the outside on one of the faces of said accessible portions, the other face of said accessible portions being covered by the contour of said tubular element, said accessible portions of said inner axial wall forming zones for fixation of said element to other parts of said structure.

5. Tubular element according to claim 4 wherein said accessible faces of the inner axial wall 4 at the ends of said tubular element are directed laterally on the same side.

6. Tubular element according to claim 4 wherein said accessible faces of the inner axial wall 4 at the ends of said tubular element are directed laterally in opposite directions.

7. Tubular element according to claim 4 wherein the reinforcements of resistant fiber 11, 12 are provided in the ends 3 of said tubular element.

* * * * *